P. A. WALLER.
CORN HUSKER.
APPLICATION FILED JUNE 13, 1913.
1,108,817.
Patented Aug. 25, 1914.
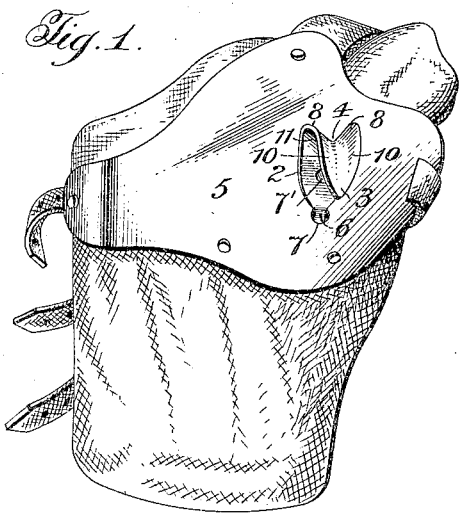
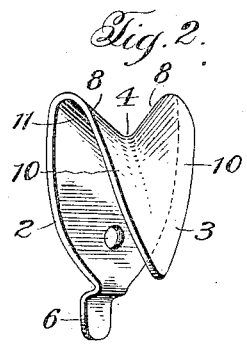
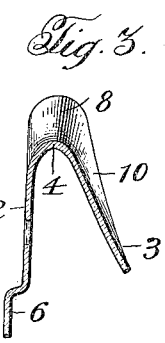
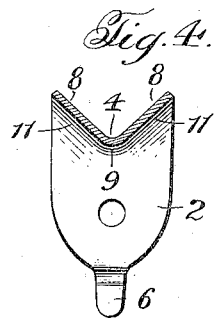
Witnesses:
Jas E Hutchinson
Geo Riley
Inventor:
Peter A. Waller,
By Bacon Milans, Attorneys

UNITED STATES PATENT OFFICE.

PETER A. WALLER, OF KEWANEE, ILLINOIS.

CORN-HUSKER.

1,108,817.  Specification of Letters Patent.  Patented Aug. 25, 1914.

Application filed June 13, 1913. Serial No. 773,436.

*To all whom it may concern:*

Be it known that I, PETER A. WALLER, a citizen of the United States, residing at Kewanee, in the county of Henry and State of Illinois, have invented certain new and useful Improvements in Corn-Huskers, of which the following is a specification, reference being had therein to the accompanying drawing.

The invention relates to improvements in corn huskers, more particularly that class of corn husking implements in which a husking hook is employed to separate or tear away the husks.

The invention aims to improve such devices and to provide an improved construction of husking hook adapted to readily shed the material from both sides thereof whereby clogging or choking of the hook is prevented and the operation of husking can be more easily and rapidly performed.

A further object of the invention is to provide an improved husking hook of simple and inexpensive construction which will possess great strength and durability.

The invention, with its advantages, and the novel combination, construction and arrangement of parts comprising the same will be understood from the following detailed description when considered in connection with the accompanying drawings forming a part hereof and illustrating one embodiment of the invention.

In the drawings: Figure 1 is a perspective view of a corn husker provided with a husking hook constructed in accordance with the present invention. Fig. 2 is a detailed perspective view of the hook. Fig. 3 is a longitudinal sectional view and Fig. 4 is a transverse sectional view through the intermediate part or connecting bend of the hook structure.

The invention comprehends a husking hook provided with portions or surfaces located at the rear portion of the bill of the hook and adapted to readily shed the material from both sides of the hook, said portions or surfaces being oppositely disposed with relation to each other and diverging rearwardly.

In the drawings, wherein like reference characters designate corresponding parts throughout the several views, is illustrated a preferred embodiment of the invention, the hook construction shown comprises a shank 2, a bill 3 and an intermediate part or connecting bend 4. The shank 2 is adapted to be fitted against and secured to the usual palm plate 5 in any suitable manner, the shank being shown, in the present instance, connected to the palm plate by a rivet 7, and provided with a lug or projection 6 engaging an opening in the said plate. The intermediate part or connecting bend 4 has oppositely disposed rearwardly diverging sides or wings 8, and the bill which tapers to a point 3' and is of general spear point formation has outwardly diverging side portions 10. The hook is preferably formed from a single blank of stout sheet metal or the like by stamping or in any other suitable way, the blank being bent transversely providing the bend 4, and also having a central longitudinal bend extending from near the base or shank 2 to near the forward portion of the bill providing a central longitudinal rib 9, and a cavity or recess at the exterior of the hook, and the intermediate connecting part or bend 4 being thus formed to have the oppositely disposed rearwardly diverging sides or wings 8 and the bill with the outwardly diverging side portions 10.

In the operation of the device, the angularly disposed sides or wings 8, which have continuous smooth interior surfaces, and the adjoining angular disposed portions 10 serve to shed the material at both sides of the hook, this construction preventing choking or clogging of the hook, and affording means whereby the operation of opening and separating the hooks from the ears can be very efficiently performed.

By forming the hook from a single blank or metal in the particular manner set forth a simple and inexpensive construction having the double shedding characteristic referred to is produced and also a structure possessing great strength and rigidity, which will effectually resist distortion or outward bending of the hook in use, the central longitudinal bend also acting to reinforce and stiffen the structure.

It will be understood that I have shown in the drawings a preferred embodiment of the invention and that changes in the particular form, construction and arrangement of parts illustrated can be made without departing from the broad principle of the invention, the scope of which is defined in the appended claims.

What I claim is:

1. A corn husker comprising a husking hook formed from a metal blank and having a shank, a bill, and a connecting portion between the same, said connecting portion having its body part bent inwardly toward the bill with its inclined side portions extending outwardly to the edges thereof whereby the connection is stiffened and serves to shed the material on both sides of the hook.

2. A corn husker comprising a husking hook formed from a metal blank and having a shank, a bill having an inward longitudinal bend, and a connecting portion between the shank and bill, said connecting portion having its body part bent inwardly toward the bill with its inclined side portions extending outwardly to the edges thereof whereby the connection is stiffened and serves to shed the material on both sides of the hook.

In testimony whereof I affix my signature in presence of two witnesses.

PETER A. WALLER.

Witnesses:
T. R. STOKES,
F. M. LAY.

Copies of this patent may be obtained for five cents each, by addressing the "Commissioner of Patents, Washington, D. C."